(12) United States Patent
Sierra

(10) Patent No.: US 8,366,283 B2
(45) Date of Patent: Feb. 5, 2013

(54) REDUCED FOGGING SHOWER MIRROR

(75) Inventor: Michael Sierra, Greenville, SC (US)

(73) Assignee: SA Ventures, LLC, Greenville, SC (US)

( * ) Notice: Subject to any disclaimer, the term of this patent is extended or adjusted under 35 U.S.C. 154(b) by 238 days.

(21) Appl. No.: 12/938,891

(22) Filed: Nov. 3, 2010

(65) Prior Publication Data

US 2011/0109967 A1     May 12, 2011

Related U.S. Application Data

(60) Provisional application No. 61/258,706, filed on Nov. 6, 2009.

(51) Int. Cl.
*G02B 7/18* (2006.01)
(52) U.S. Cl. ....................................................... 359/512
(58) Field of Classification Search .................. 359/507, 359/509, 845
See application file for complete search history.

(56) References Cited

U.S. PATENT DOCUMENTS 7,249,858 B2 *   7/2007   Blackwood ................... 359/509

* cited by examiner

*Primary Examiner* — Euncha Cherry
(74) *Attorney, Agent, or Firm* — Dority & Manning, P.A.

(57) ABSTRACT

A reduced fogging mirror configured to be removably mounted to a surface such as a shower surface is disclosed. The reduced fogging mirror includes a reflective substrate and a foam backing attached to the reflective substrate. The foam backing is used as an insulator to keep the temperature of the reflective surface from fluctuating. This allows the reflective surface to maintain a temperature similar to a shower's water and steam, reducing the fogging on the reflective substrate. The foam backing is also configured to retain water such that the reduced fogging mirror can be adhered to the shower surface using water tension between the foam backing and the shower surface.

17 Claims, 2 Drawing Sheets

REDUCED FOGGING SHOWER MIRROR

PRIORITY CLAIM

This application claims the benefit of priority of U.S. Provisional Application No. 61/258,706, filed Nov. 6, 2009, which is incorporated herein by reference for all purposes.

FIELD

The present disclosure relates generally to mirrors, and more particularly to a reduced fogging mirror for use in a shower or other location.

BACKGROUND

Mirrors can be used in a variety of locations for a variety of purposes. A need exists for a mirror that can be used effectively in the shower for purposes such as shaving. However, mirrors used in and around showers are susceptible to fogging. The fogging is caused when steam from the shower comes in contact with the mirror's cooler surface. Until the temperature difference is equalized, the mirror remains fogged up and is not useful as a reflective surface.

Current methods for alleviating mirror fogging include adding a fog free coating to the mirror's surface, which wears off, and having warm water continually flow over the mirror's surface in order to keep it warm. These techniques can be expensive to manufacture and provide extra undesirable bulk to the product.

Thus, a need exists for a non-fogging mirror which is sleek in design and can be inexpensively produced that keeps the mirror surface at a temperature so as to reduce fogging.

SUMMARY

Aspects and advantages of the invention will be set forth in part in the following description, or may be obvious from the description, or may be learned through practice of the invention.

One exemplary embodiment of the present disclosure is directed to a reduced fogging mirror configured to be removably mountable to a surface. The reduced fogging mirror includes a reflective substrate and a foam backing attached to the reflective substrate. The foam backing is formed from a thermally insulating foam material. The foam backing has a thickness sufficient to reduce temperature transfer from the surface to the reflective substrate. For instance, in a particular embodiment, the foam backing can have a thickness in the range of about 3 mm to about 10 mm, such as about 6 mm.

In a variation of this exemplary embodiment, the foam backing can be configured to retain water. For instance, the foam backing can include a closed cell foam formed from, for example, ethylene-vinyl acetate. The foam backing can have a thickness sufficient to allow the reduced fogging mirror to be adhered to the surface using water tension between the surface and the foam backing when the foam backing is retaining water.

In one particular of this exemplary embodiment, the reflective substrate can include an acrylic mirror. In another particular aspect of this exemplary embodiment, the reflective substrate can include a reflective film sheet adhered to a substrate backing, such as a polystyrene substrate backing.

In still another particular aspect of this exemplary embodiment, the mirror can include a magnet embedded in the foam backing. Moreover, the reduced fogging mirror can have a rectangular, circular, triangular, polygonal, or other suitable shape.

Another exemplary embodiment of the present disclosure is directed to a reduced fogging mirror configured to be mountable to a shower surface. The reduced fogging mirror includes a reflective substrate and a foam backing attached to the reflective substrate. The foam backing is formed from a thermally insulating material and is configured to retain water. The foam backing has a thickness sufficient to allow the reduced fogging mirror to be adhered to the shower surface using water tension between the shower surface and the foam backing when the foam backing is retaining water. For instance, in a particular embodiment, the foam backing can have a thickness of about 3 mm to about 10 mm, such as about 6 mm. The foam backing can be a closed cell foam formed from, for instance, ethylene-vinyl acetate.

A further exemplary embodiment of the present disclosure is directed to a reduced fogging mirror configured to be mountable to a shower surface. The reduced fogging mirror includes a reflective substrate and a foam backing attached to the reflective substrate. The foam backing is formed from a thermally insulating foam material, such as a ethylene-vinyl acetate closed cell foam material. The foam backing has a thickness in the range of about 3 mm to about 10 mm, such as about 6 mm.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure, including the best mode, to one of ordinary skill in the art, is set forth more particularly in the remainder of the specification, including reference to the accompanying figures, in which.

DETAILED DESCRIPTION

Figure 1:
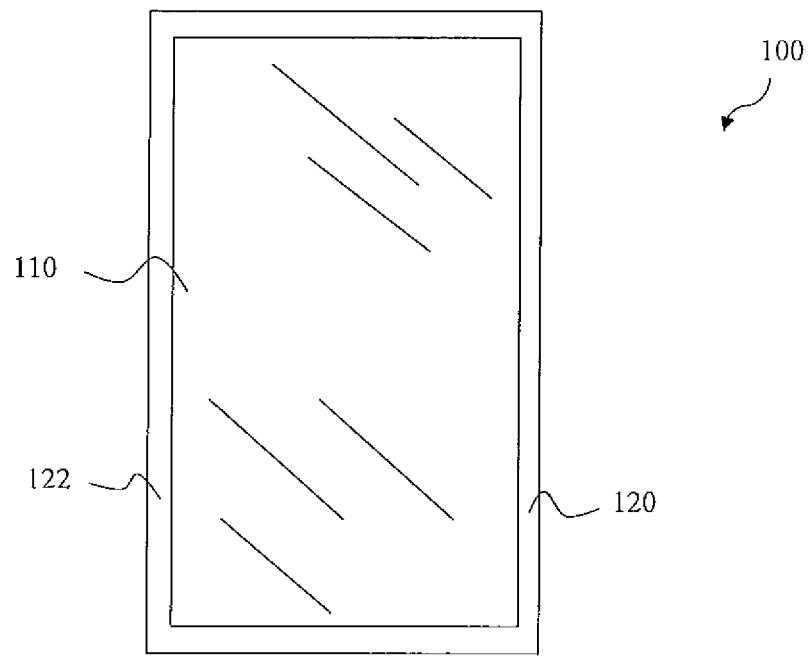
FIG. 1 is a front view of an exemplary reduced fogging mirror according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a reduced fogging mirror configured to be removably mounted to a surface such as a shower surface. The reduced fogging mirror includes a reflective substrate and a foam backing attached to the reflective substrate. The foam backing is used as an insulator to keep the temperature of the reflective surface from fluctuating. This allows the reflective surface to maintain a temperature similar to a shower's water and steam, reducing the fogging on the reflective substrate. The foam backing is also configured to retain water such that the reduced fogging mirror can be adhered to the shower surface using water tension between the foam backing and the shower surface. In this manner, the present disclosure provides an improved non-fogging mirror that can be manufactured at reduced cost, without expensive fog free coatings that are susceptible to wear.

Figure 2:
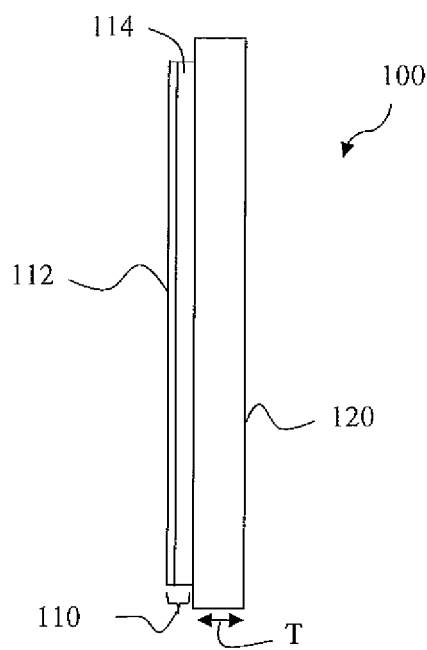
FIG. 2 is a side view of an exemplary reduced fogging mirror according to an exemplary embodiment of the present disclosure.

FIGS. 1 and 2 illustrate a first exemplary reduced fog shower mirror 100 according to an exemplary embodiment of the present disclosure. The reduced fog shower mirror 100 includes a reflective substrate 110 and a foam backing 120 attached to the reflective substrate.

As illustrated in FIG. 2, the reflective substrate 110 can include a reflective film sheet 112 adhered to a substrate backing 114. The substrate backing 114 can be formed from a plastic material, such as polystyrene and provides a hard backing for the reflective film sheet 112 to ensure a wrinkle free surface. Those of ordinary skill in the art, using the disclosures provided herein, should understand that any reflective surface can be used for reflective substrate 110 without deviating from the scope of the present invention. For instance, in a particular embodiment, the reflective substrate can include an acrylic mirror or other suitable reflective surface.

The reflective substrate 110 is attached to a foam backing 120. Foam backing 120 is formed from a thermally insulating material to provide insulation for the reflective substrate 110, keeping it warm and reducing fogging of the reflective substrate. The foam backing 120 is preferably formed from a closed cell foam material that can retain water, such as an ethylene-vinyl acetate material or other suitable material.

As illustrated in FIG. 2, the foam backing 120 has a thickness T. The thickness T is preferably sufficient to allow reduced temperature transfer between a shower surface and the reflective substrate 110. The thickness T is also preferably sufficient to allow the reduced fogging mirror to be adhered to the shower surface using water tension between the shower surface and the foam backing when the foam backing is retaining water. The greater the thickness T, the greater the insulating properties of the foam backing 120, providing for improved fog reduction on reflective substrate 110. However, if thickness T is too thick, the water tension between the shower surface and the foam backing 120 will not be able to support the weight of reduced fogging mirror 100. In this regard, the thickness T is preferably configured to provide enough insulation to reduce fogging on reflective substrate 110 while still allowing the reduced fogging mirror 100 to be supported on a shower surface using water tension between the foam backing 120 and the shower surface. For instance, in a particular embodiment, the thickness T of foam backing 120 is in the range of about 3 mm to about 10 mm, such as about 6 mm.

The reduced fogging mirror 100 of FIGS. 1 and 2 has a rectangular shape. However, those of ordinary skill in the art, using the disclosures provided herein, should understand that any shape can be used without deviating from the scope of the present disclosure. The reflective substrate 110 is attached to foam backing 120 such that foam backing 120 forms a border 122 around reflective substrate 110. The border 122 provides a surface for a user to grip the reduced fogging mirror 100. The border 122 or the reflective substrate 110 can include indicia, such as labels, advertising, etc., for display to a user.

For use in the shower, the reduced fogging mirror 100 is placed under the warm stream of water to warm up all components. Both the reflective substrate 110 and the foam backing 120 are wetted with water for optimal results in the shower. The foam backing 120 of the reduced fogging mirror 100 is then pressed against a shower wall or shower door. Water tension causes the foam backing to adhere to the particular location within a shower. The reduced fogging mirror can then be used for purposes such as shaving in the shower.

Figure 3:
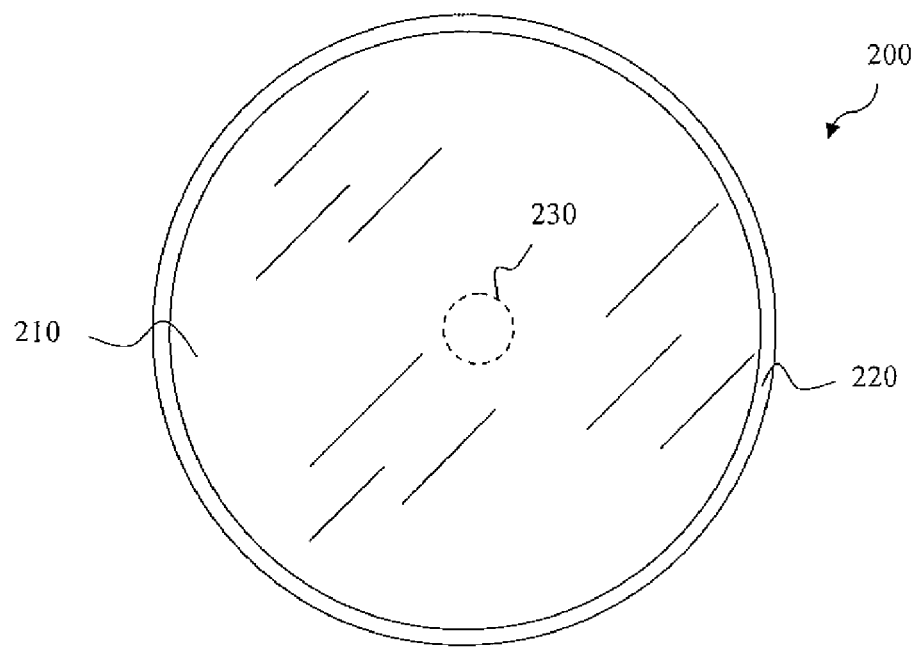
FIG. 3 is a front view of an another exemplary reduced fogging mirror according to an exemplary embodiment of the present disclosure.
Figure 4:
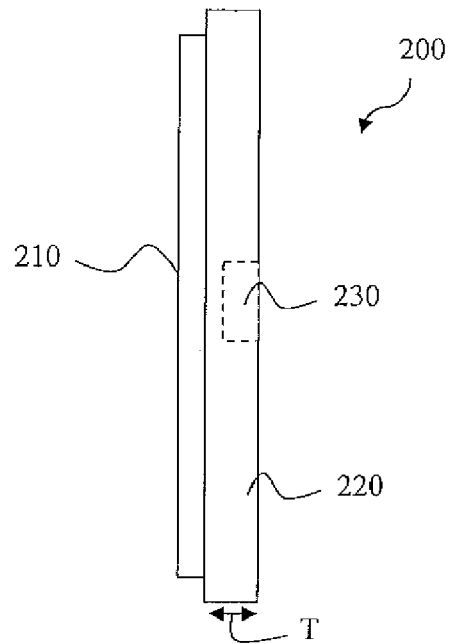
FIG. 4 is a side view of another exemplary reduced fogging mirror according to an exemplary embodiment of the present disclosure.

FIGS. 3 and 4 illustrate a reduced fogging shower mirror 200 according to another exemplary embodiment of the present disclosure. Similar to the reduced fogging mirror 100 of FIGS. 1 and 2, the reduced fogging shower mirror 200 of FIGS. 3 and 4 includes a reflective substrate 210, such as an acrylic mirror, and a foam backing 220 having a thickness T. As set forth above, the thickness T is preferably selected to reduce temperature transfer from a shower surface to the reflective substrate 210 and to allow the reduced fogging mirror 200 to be adhered to the shower surface using water tension.

Reduced fogging shower mirror 200 further includes a magnet 230 embedded in foam backing 220. Magnet 230 provides additional support for attaching reduced fogging shower mirror 200 to a metal surface. Reduced fogging shower mirror 200 is also circular in shape. Those of ordinary skill in the art, using the disclosure provided herein, should understand that any shape can be used without deviating from the scope of the present disclosure. For instance, the reduced fogging shower mirror can have a rectangular shape, square shape, triangular shape, polygonal shape, or other suitable shape.

The reduced fogging mirrors according to exemplary embodiments of the present disclosure are not limited to shower uses. The embodiments of the present disclosure provide a reflective surface which can be used outside of a shower as well. In these situations, it may not be necessary to wet both surfaces of the mirror prior to use.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A reduced fogging mirror configured to be removably mountable to a surface, the reduced fogging mirror comprising:
   a reflective substrate;
   a foam backing attached to said reflective substrate, said foam backing being formed from a thermally insulating foam material;
   wherein said foam backing has a thickness capable of reducing temperature transfer from the surface to said reflective substrate and capable of allowing the reduced fogging mirror to be supported on the surface using water tension between said foam backing and the surface when said foam backing is retaining water.

2. The reduced fogging mirror of claim 1, wherein said foam backing is configured to retain water.

3. The reduced fogging mirror of claim 1, wherein said thickness of said foam backing is in the range of about 3 mm to about 10 mm.

4. The reduced fogging mirror of claim 1, wherein said thickness of said foam backing is in the range of about 6 mm.

5. The reduced fogging mirror of claim 1, wherein said reflective substrate comprises an acrylic mirror.

6. The reduced fogging mirror of claim 1, wherein said reflective substrate comprises a reflective film sheet adhered to a substrate backing.

7. The reduced fogging mirror of claim 6, wherein said substrate backing comprises a polystyrene substrate.

8. The reduced fogging mirror of claim 1, wherein said foam backing comprises a closed cell foam.

9. The reduced fogging mirror of claim 1, wherein said foam backing comprises ethylene-vinyl acetate.

10. The reduced fogging mirror of claim 1, wherein said mirror further comprises a magnet embedded in said foam backing.

11. The reduced fogging mirror of claim 1, wherein said reduced fogging mirror has a rectangular, circular, triangular, or polygonal shape.

12. A reduced fogging mirror configured to be mountable to a shower surface, the reduced fogging mirror comprising:
a reflective substrate;
a foam backing attached to said reflective substrate, said foam backing being formed from a thermally insulating foam material, said foam backing configured to retain water;
wherein said foam backing has a thickness capable of reducing temperature transfer from the surface to said reflective substrate and capable of allowing said reduced fogging mirror to be adhered to the shower surface using water tension between the shower surface and said foam backing when said foam backing is retaining water.

13. The reduced fogging mirror of claim 12, wherein the thickness of said foam backing is in the range from about 3 mm to about 10 mm.

14. The reduced fogging mirror of claim 13, wherein the thickness of said foam backing is about 6 mm.

15. The reduced fogging mirror of claim 13, wherein said foam backing comprises a closed cell foam.

16. The reduced fogging mirror of claim 15, wherein said foam backing comprises ethylene-vinyl acetate.

17. A method for using a reduced fogging mirror, comprising:
placing a reduced fogging mirror under a water stream, the reduced fogging mirror comprising a reflective substrate and a foam backing attached to the reflective substrate, the foam backing being formed from a thermally insulating foam material, the foam backing configured to retain water; and
pressing the foam backing of the reduced fogging mirror against a shower surface such that water tension causes the foam backing to adhere to the surface.

* * * * *